Sept. 10, 1957  R. A. FRYKLUND  2,806,216
THREE-DIMENSIONAL POSITION-INDICATING SYSTEMS
Filed June 23, 1954  2 Sheets-Sheet 1

INVENTOR
ROBERT A. FRYKLUND
BY
ATTORNEY

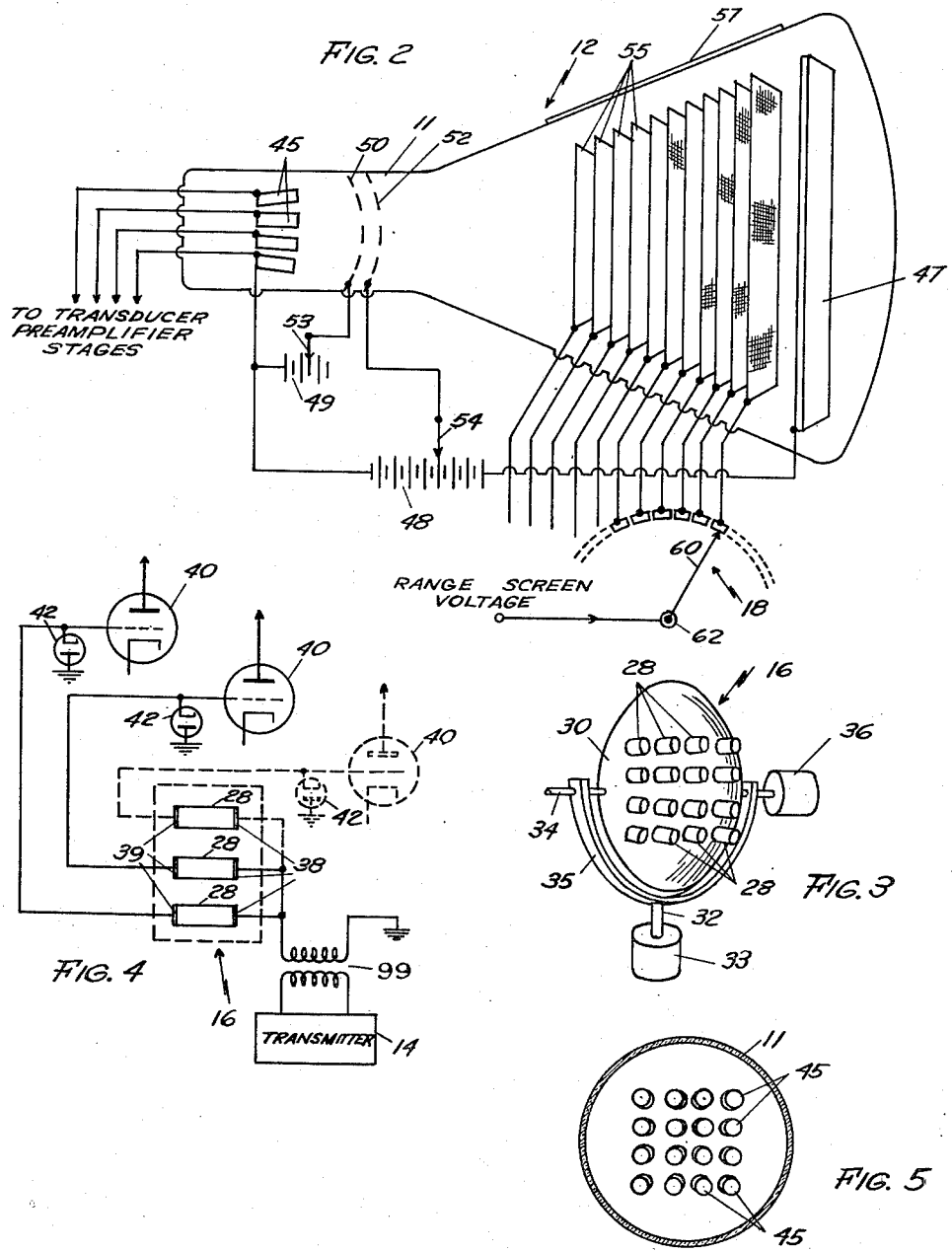

United States Patent Office 2,806,216
Patented Sept. 10, 1957

2,806,216

THREE-DIMENSIONAL POSITION-INDICATING SYSTEMS

Robert A. Fryklund, Dedham, Mass., assignor to Raytheon Manufacturing Company, Waltham, Mass., a corporation of Delaware Application June 23, 1954, Serial No. 438,670

16 Claims. (Cl. 340—3)

This invention concerns a position-indicating system and, more particularly, relates to a system including an electron discharge device for presenting target information in a three-dimensional display.

Echo-ranging systems are well known which indicate the range of objects from which energy is reflected by the time required for a transmitted signal to reach the object and return therefrom.

It is often desirable to display objects disposed in a volume in such a way that azimuth and elevation of the objects are indicated in addition to range. It is further desirable to indicate azimuth, elevation and range simultaneously upon a single indicator. By means of this invention one may determine the range of each of several objects, as well as the range of portions of the same object obliquely disposed in the volume of space explored, while also locating the target in azimuth and elevation on the same indicator.

The indicating system includes a cathode ray tube having means for forming several independent divergent electron streams within the tube. The indicating system also includes means capable of directing a plurality of beams of energy in the total volume to be explored similar in arrangement to that of the electron streams within the cathode ray tube. If an object is located within a portion of the total volume occupied by a given beam of energy, some of that energy will be reflected from said object along the same path as that of the transmitted energy, and the received energy can be made to control the current of the corresponding electron streams in the cathode ray tube. All of the electron streams are normally cut off except the ones controlled individually by energy received from the portions of the total volume containing an object. The cathode ray tube further includes a series of equally-spaced range screens coated with a fluorescent material and interposed between the electron stream sources and an anode adjacent the other end of said tube.

A commutating device is employed which will sequentially apply a positive voltage to the individual range screens. The rate of commutation is proportional to the speed of propagation of energy through the medium being explored. For example, if a transducer is mounted on shipboard and propagates sound into salt water at a speed of 1500 yards per second, one cycle of commutation should be completed in two seconds if a total range of 1500 yards, corresponding to a total return trip of 3,000 yards, is to be explored.

Whenever reflected energy is received from an object within a particular portion of the total volume, the corresponding electron stream-forming means is caused to direct an electron stream toward the array of range screens. This electron stream will pass through the range screens on the way to the anode and will cause that particular range screen which is supplied with a positive voltage from the commutating device to fluoresce over the area of the electron stream at the region of interception by the screen. If more than one object appears in the volume of search, a corresponding number of areas of the range screen lattice will be illuminated.

In order to increase the accuracy of the device, a portion of the total volume explored by the system may be examined by increasing the commutation rate so that one cycle of the commutation corresponds to the range interval of said portion and by keying the transmitter ahead of the first commutation instant of the commutation cycle by an amount equal to the lower limit of range divided by twice the speed of propagation of energy. For example, if a range interval of 150 yards were to be explored in the example above mentioned, the rate of commutation would be increased tenfold. If, for example, a range of from 300 to 450 yards (range interval of 150 yards) is to be surveyed, the initiative of the commutation cycle would be delayed by $$\frac{2 \times 300}{1500} = 0.4 \text{ second}$$

after keying of the transmitter.

The transducer may be trained in azimuth and elevation, as by appropriate electromagnetic driving means, to permit indication of objects over any portion of the medium desired.

In the drawing:

Fig. 2 is a cross-sectional view of the cathode ray tube indicator of Fig. 1;

Fig. 3 is a view illustrating a typical transducer mounting arrangement;

Fig. 4 illustrates a portion of the indicating system of Fig. 1; and

Fig. 5 illustrates a transverse view of the cathode array of the cathode ray tube of Fig. 2.

Figure 1:
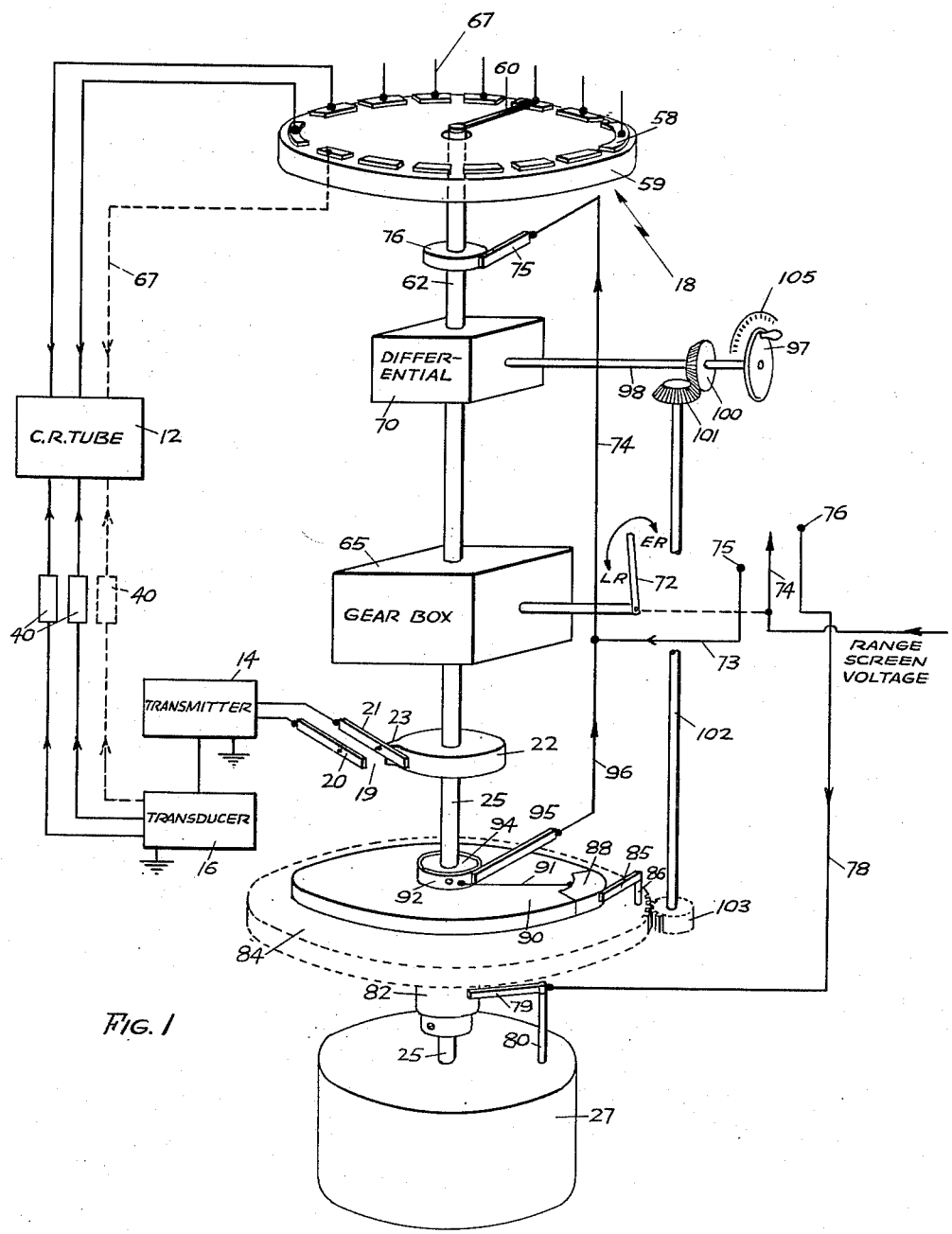
Fig. 1 is a view illustrating an object-indicating system in accordance with the invention.

The object-indicating system of Fig. 1 comprises essentially the cathode ray tube 12, shown in detail in Fig. 2, a transmitter 14, a transducer 16, and commutating means 18. Transmitter 14 is keyed upon cyclical closure of switch contacts 20 and 21 of switch 19 by a rotating cam 22 affixed to the shaft 25 of a driving motor 27. Cam 22 is made of an electrical insulating material and includes a projecting portion 23. During closure of said switch contacts transducer 16 is energized and energy is propagated into the medium to be explored in the form of a plurality of discrete beams which preferably should combine to occupy the entire volume of the medium to be explored without overlapping of the beams. Some degree of overlapping of beams is tolerable, however, provided that the requirements of accuracy in azimuth and elevation are not too stringent. The individual transducer elements 28 (Fig. 3) of the transducer array 16 may be discs made of a ceramic such as barium titanate which produce an electrical potential across electrodes attached to opposed faces when vibrating in a direction normal to said faces and which vibrate in the latter direction when excited by an electrical source. The transducer elements 28, however, are not limited to those described herein; for example, crystal or magnetostrictive transducers may also be used. These elements are preferably mounted on a spherical supporting member 30 covered with a layer of material (not shown) such as an air-foam rubber capable of absorbing energy radiated from the back face of the transducer. The transducer elements 28 are shown arranged in substantially a square but they may cover the entire hemispherical area of supporting member 30, if desired. The spacing between transducer elements is exaggerated in Fig. 3 in the interest of clarity and it should be understood that these elements combine to produce beams of energy covering the entire volume of the medium to be explored. If the beams of energy are slightly divergent the spacing between transducer elements may be increased subject, of course, to requirements of accuracy at very short range.

Transducer mounting means 30 is mounted for revolution about two mutually perpendicular axes. Rotation about a first axis, coincident with the axis of shaft 32, is accomplished by motor 33 whose shaft 32 is attached to a U-shaped bracket 35. Transducer mounting means 30 is supported from a shaft 34 which, in turn, is mounted in bracket 35. Motor 36, attached to one end of shaft 34, will effect rotation of the transducer mounting means about a second axis, that is, the axis of shaft 34, which is perpendicular to the first axis of rotation. The axes of rotation preferably are horizontal and vertical so that azimuth and elevation information may be obtained. The invention is not limited to the transducer driving means shown in Fig. 3 but may be of any type capable of directing the transducer array in any desired position.

As shown in Fig. 4, the output from transmitter 14 may be applied to one electrode 38 of each element 28 of transducer 16 by way of a transformer 99, one end of whose secondary is grounded. The other electrode 39 of each transducer element 28 is connected to the grid of a corresponding pre-amplifier stage 40 and to the cathode of the neon anode 42 whose anode is grounded. When transmitter 14 is keyed, the transducer elements 28 are all connected in phase so that all the energy departing from transducer array 16 leaves at the same instant of time. Neon tubes 42 conduct during the transmission interval and the circuit is completed through ground. During the interval in which the transmitter is off, compressional wave energy intercepted by an object and picked up by each individual transducer from said object is converted into electrical energy which is supplied through the input or grid circuit of the corresponding pre-amplifier stage 40. Since the echoes from objects are much weaker than the transmitter energy the neon lamps do not shunt out the pre-amplification stage during reception. The invention is not limited to the transducer array shown and described herein. The use of delay line techniques in connection with transducers may be resorted to.

The amplified echo signals in the output or plate circuit of each pre-amplifier stage 40, if any, is applied to a corresponding electron gun of cathode ray tube 12. Each electron gun includes a cathode 45 mounted within the neck 11 of tube 12 in an array similar to that of the transducer elements of array 16, as shown in Fig. 5. Cathodes 45 may be flared outward slightly in the same manner as transducer elements 28 so that the electron streams emitted from these cathodes diverge in the manner of the beams of energy propagated by the transducer array.

An accelerating anode 47 positioned adjacent the face of cathode ray tube 12 is maintained at a relatively high positive potential with respect to the cathodes of the electron guns by means of unidirectional source 48. As shown in Fig. 2, the accelerating anode is in the form of a solid plate although either an accelerating mesh screen or an aquadag deposited on the inner wall of the tube may serve the same purpose. Collecting electrode 47 may be solid, inasmuch as the viewing is to be done within the cubical range screen lattice and not on a flat end screen at or adjacent the face of the tube, as in conventional cathode ray tubes.

An apertured intensity control grid 50, having substantially the same curvature as the mounting surface of the transducer array and maintained negative with respect to the cathodes as by a battery 49, is disposed adjacent the cathode assembly to provide blanking of the electron stream in the absence of external signals from the transducer. A grid 52 arranged concentric with intensity control grid 50 and maintained positive relative to the cathodes, serves to diverge the beams by the proper amount. The potential of grids 50 and 52 may be varied by means of potentiometers 53 and 54, respectively.

The received signal resulting from reflections from an object is applied to a corresponding electron gun. For example, the amplified received signal from a given preamplifier 40 is applied to the cathode 45 of the corresponding electron gun, thereby overcoming the blanking voltage on the intensity control grid and projecting an electron stream through grids 50 and 52 toward accelerating anode 47.

A multiplicity of range screens 55 are positioned in the cathode ray tube 12 between the stream-forming grid 52 and accelerating anode 47. Screens 55 are equally spaced and the position of each screen along the longitudinal axis of tube 12 corresponds to a given distance in the medium being explored from the transducer array, and may therefore be referred to as "range screens." Each range screen is coated with a fluorescent material, or is otherwise adapted to emit visible radiation under proper circumstances, which will now be explained.

The light emitted by a given coated screen 55, when impinged upon an electron stream, is a function of the potential of the screen relative to cathode 45. Below a certain potential the range screen will not emit visible radiation even though interceptive of such an electron stream. The various range screens, therefore, as normally operated, are maintained either at zero potential, or at a potential less than that to which visible emission can occur.

At least a considerable portion of the electron stream passes through the screens en route to the accelerating anode. The proportion of the total electron stream current absorbed by the screens is a function of the mesh spacing. The screen should be made with relatively coarse mesh so that absorption is not excessive and also so that the screen may be examined visually from various angles. The screens, however, should be of sufficiently fine mesh to permit adequate emission of light under certain conditions of electron stream impingement.

A relatively high positive potential from any conventional unidirectional source, otherwise referred to as a range screen voltage, is sequentially applied to each of the range screens by means of a commutating device 18 shown in detail in Fig. 1 and in fragmentary schematic form in Fig. 2. The commutating device as shown and described herein is a mechanical commutator, although the invention need not be limited thereto, inasmuch as an electrical commutating means including, for example, a counter chain may be used. The commutating device 18 as shown in Fig. 1 may consist of a plurality of spaced, circularly disposed, electrically conductive segments 58 mounted about the periphery of an electrically insulating base 59 and a rotating arm 60 attached to rotating shaft 62 which, in turn, is driven through a gear box 65 and differential 70 by motor 27. Each commutator segment 58 is connected to a corresponding range screen by a corresponding lead 67. When the ratio of the gear box is one to one, as when handle 72 is thrown over to the Long Range position, indicated as L. R. in Fig. 1, switch arm 74, manually connected to handle 72, is brought into contact with switch contact 75. The range screen voltage is then transferred to commutator arm 60 through a path consisting of leads 73 and 74, brush 75 resiliently engaging an electrically conductive collar 76 affixed to shaft 62 and the upper portion of shaft 62. The rotating arm 60 of the commutator 18 is adapted to contact the commutator segment 58 electrically connected to the first range screen (range screen nearest the electron guns) at the instant keying cam 22 closes keying contacts 20 and 21. The positive range screen voltage is thus applied to the screen corresponding to zero range. Commutator arm 60 should pass on to the next commutator segment after the energy propagated from the transducer has traveled twice the distance corresponding to the range of the second range screen. At this time the positive range screen voltage is applied to the second range screen. The time interval between contacting of successive commutator segments 58 by commutator arm 60 is always equal to the range interval between adjacent range screens.

Any practical number of range screens may be used. The range interval or range resolution of the system will be equal to the total range to be explored divided by the number of screens. If 15 screens were used for a system having a total range of 1500 yards, the range resolution would be $$\frac{1500}{15} = 100 \text{ yards}$$

A calibrated scale 57 may be mounted lengthwise of the tube to indicate the range corresponding to a given luminous area. Whenever an object is indicated on the cubical range screen lattice, the approximate range is determined by noting the scale marking opposite the glowing screen.

In order to indicate the object position with greater accuracy, a portion of the total volume in the immediate vicinity of the object is explored and that portion is "expanded" to provide increased range resolution. This feature may best be described by resorting to a numerical example. Suppose, for example, that the total range of the system when handle 72 is in the Long Range position is 1500 yards and that the transducer is propagating sound energy into a volume of sea water at a velocity of 1500 yards per second. If 10 equally spaced range screens are used in the tube, the range resolution or interval would be 150 yards and the time interval between the application of the positive range screen voltage to adjacent range screens would be 0.2 second. Suppose now that a glow appears on the second range screen corresponding to 150 yards and that, in fact, the object is 120 yards distant from the transducer. By shifting handle 72 to the Expanded Range position, indicated as E. R. in Fig. 1, the gear ratio of gear box 65 is changed from one to one to ten to one, so that rotating arm 60 of commutator 18 rotates at ten times its former speed. Simultaneously, switch arm 74 is closed against contact 76 and the range screen voltage is applied to the commutator by way of lead 78, brush 79 resting on the electrically conductive hub portion 82 of gear wheel 84 and mounted on a post 80 supported on the housing of motor 27, a brush 85 mounted on electrically conductive post 86 supported on the upper surface of gear wheel 84, electrically conductive segmental insert 88 in an electrically insulating disc 90, lead 91 interconnecting insert 88 and a metallic ring 92 surrounding hub portion 94 of disc 90, brush 95, leads 96 and 74, brush 75 resiliently engaging the electrically conductive hub 76 affixed to shaft 62, and finally the upper portion of shaft 62. If the differential 70 is left as before, the commutator arm will supply the range screen voltage ten times as rapidly as before, so that the range screens formerly corresponding to ranges of 0, 150, 300, 450 . . . 1500 yards now correspond to ranges of 0, 15, 30, 45 . . . 150 yards, respectively. If the object is actually at 120 yards from the transducer, the thirteenth range screen from the electron gun of the tube will be illuminated over a region dependent upon the attitude of the object. The number of range intervals may, of course, be increased beyond two simply by designing the gear box 65 with a greater number of gear ratio.

In the device so far described, rotating arm 60 of commutating device 18 contacts a segment connected to the first range screen simultaneously with the closure of transmitter keying contacts 20 and 21 by cam 22. It is desirable and necessary to select any portion of the total range during use of the expanded range. For example, suppose that, in the previous recited illustration, an object is actually located 1240 yards from the transducer and a range interval of 150 yards is to be maintained. With the gear box handle 72 on the Long Range position, the ninth range screen, corresponding roughly to 1240 yards, would be illuminated. It is now desirable to explore over a range of, say, 1200 yards to 1350 yards, or any other range interval in which 1240 yards is included. In order to accomplish this, the rotating commutator arm 60 must be made to contact the commutator segment connected to the first range screen after an interval of time occurring after keying of the transmitter by an amount equal to twice the time taken for the energy propagated from the transducer to travel 1200 yards. This delay is introduced by means of differential 70 to whose input shaft 98 a hand wheel 97 is connected. By rotating the hand wheel, the position of the commutator arm 60 relative to the projection 23 on keying cam 22 may be varied in amount dependent upon the degree of rotation of said hand wheel. Since rotating arm 60 is scanning the array of commutative segments ten times during each transmitter cycle, it is necessary to apply the range screen voltage during the proper revolution of the commutator arm in order to avoid ambiguity as to the particular 150-yard range interval selected. This ambiguity is resolved in the following manner. The gear wheel 84, which is floating on shaft 25, is caused to rotate at a speed of $$\frac{1}{n}$$

times that of the differential input shaft 98, where $n$ is the ratio of gear box 65 during operation in the expanded range. This reduction in speed of gear wheel 84 effected through the gear train comprising worm gears 100 and 101 mounted on differential input shaft 88 and gear shaft 102, respectively, and a pinion gear 103 attached to the other end of gear shaft 102 and engaging gear wheel 84. The extent of the electrically conductive insert 88 in the disc 90 is dependent upon the expanded range interval. In the example cited, where the expanded range interval is 150 yards, or one-tenth the total range of the system, the insulating disc 90 makes a complete revolution in a time corresponding to the total system range of 1500 yards. By making the length of the periphery of segment 88 equal to one-tenth of the circumference of disc 90, the range screen voltage would be applied to the commutator during only one cycle of accelerated commutation. The particular cycle involved will depend upon the position of segment 88 and disc 90 with respect to brush 85 fixedly mounted to gear wheel 84. As the differential hand wheel 97 is turned, gear wheel 84 is rotated and the position of brush 85 with respect to disc 90 is varied. In this way, the fixed time interval over which the range screen voltage may be applied to the range screens is varied in accordance with the approximate location of the object as determined during long range operation. To examine an object located at a different range from the transducer, the differential hand wheel, which may be calibrated in terms of range, is rotated until a visual indication corresponding thereto occurs on one of the range screens. By reading off the expanded range opposite the luminous screen on scale 57 longitudinally disposed along the tube and adding this to the indication on the differential scale 105, the total range of the object may be indicated with a high degree of accuracy. The azimuth and elevation of the object within the range indicated is, of course, determined by the position of the luminous area on the particular luminous range screen.

Although the system described may be utilized in searching for under-water objects by means of a transducer array capable of transforming electrical energy into compressional wave energy, the object-indicating system of the subject invention is not limited thereto. For example, the system may be used to scan the sky for aircraft, in which case the transducer would be replaced by an energy directive array such as an antenna capable of transmitting and receiving energy in a plurality of discrete patterns in space. The received echo signals would then be applied to the cathode ray tube stream-forming elements as in the system already described. If necessary to isolate the transmitter and receiver, any conventional means, such as duplexer or TR box, may be used with such a system.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A system for indicating the position of objects in a volume of a given medium by the use of transmitted waves and their reflections comprising a receiving means sensitive to waves reflected from objects in different sections of said volume as said volume is surveyed, an electron discharge device including electron stream-forming means for directing an electron stream over a portion of said device corresponding in position to the section of said volume surveyed in response to reception of reflected waves from that section, and a plurality of spaced stream-intercepting screens whose position along the longitudinal axis of said device corresponds to discrete ranges, a control voltage, commutating means for progressively applying said control voltage to successive ones of said screens at a rate dependent upon the speed of propagation of said waves in said medium, said screens being phosphorescent only during the application of said control voltage thereto, and means responsive to the presence of an object in a given section of said volume for producing a visible display on that one of said screens corresponding to the distance of said object from said receiving means.

2. A system for indicating the position of objects in a volume of a given medium by the use of transmitted waves and their reflections comprising a receiving means sensitive to waves reflected from objects in different sections of said volume as said volume is surveyed, an electron discharge device including electron stream-forming means for directing an electron stream over a portion of said device corresponding in position to the section of said volume surveyed in response to reception of reflected waves from that section, and a plurality of spaced stream-intercepting screens whose position along the longitudinal axis of said device corresponds to discrete ranges, a control voltage, commutating means for progressively applying said control voltage to successive ones of said screens at a rate dependent upon the speed of propagation of said waves in said medium, said screens being phosphorescent only during the application of said control voltage thereto, and means responsive to the presence of an object in a given section of said volume for producing a visible display on that one of said screens corresponding to the distance of said object from said receiving means, said commutating means including means for varying the relative time of application of said control voltage to the first of said screens with respect to the time of generation of said transmitted waves.

3. A system for indicating the position of objects in a volume of a given medium by the use of transmitted waves and their reflections comprising a multiplicity of receiving means each sensitive to waves reflected from objects in different sections of said volume and combining to cover the volume to be surveyed, an electron discharge device including a plurality of electron stream-forming means each capable of directing an electron stream over a portion of said device corresponding in position to the section of said volume surveyed in response to reception of reflected waves from that section, and a plurality of spaced stream intercepting screens whose position along the longitudinal axis of said device corresponds to discrete ranges, a control voltage, commutating means for progressively applying said control voltage to successive ones of said screens at a rate dependent upon the speed of propagation of said waves in said medium, said screens being phosphorescent only during the application of said control voltage thereto, means responsive to the presence of an object in a given section of said volume for producing a visible display on that one of said screens corresponding to the distance of said object from said receiving means.

4. A system for indicating the position of objects in a volume of a given medium by the use of transmitted waves cyclically generated by keying means and their reflections comprising a multiplicity of receiving means each sensitive to waves reflected from objects in different sections of said volume and combining to cover the volume to be surveyed, an electron discharge device including a plurality of electron stream-forming means each capable of directing an electron stream over a portion of said device corresponding in position to the section of said volume surveyed in response to reception of reflected waves from that section, and a plurality of spaced stream intercepting screens whose position along the longitudinal axis of said device corresponds to discrete ranges, a control voltage, commutating means for progressively applying said control voltage to successive ones of said screens at a rate dependent upon the speed of propagation of said waves in said medium, said screens being phosphorescent only during the application of said control voltage thereto, means responsive to the presence of an object in a given section of said volume for producing a visible display on that one of said screens corresponding to the distance of said object from said receiving means, said commutating means including means for varying the relative time of application of said control voltage to the first of said screens with respect to the time of generation of said transmitted waves.

5. A system of indicating the position of objects in a volume of a given medium by the use of transmitted waves cyclically generated by keying means and their reflections comprising a multiplicity of receiving means each sensitive to waves reflected from objects in different sections of said volume and combining to cover the volume to be surveyed, an electron discharge device including a plurality of electron stream-forming means each capable of directing an electron stream over a portion of said device corresponding in position to the section of said volume surveyed in response to reception of reflected waves from that section, and a plurality of spaced stream intercepting screens whose position along the longitudinal axis of said device corresponds to discrete ranges, a control voltage, commutating means for progressively applying said control voltage to successive ones of said screens at a rate dependent upon the speed of propagation of said waves in said medium, said screens being phosphorescent only during the application of said control voltage thereto, means responsive to the presence of an object in a given section of said volume for producing a visible display on that one of said screens corresponding to the distance of said object from said receiving means, means for varying the rate of commutation to permit inspection of a section of said volume, said commutating means including means for varying the relative time of application of said control voltage to the first of said screens wtih respect to the time of generation of said transmitted waves.

6. A three-dimensional system for indicating the position of objects comprising a transducer array, transmitter means for initially energizing said array, said array being responsive to said energization for propagating energy along a plurality of discrete beams each occupying a given volume, said transducer array comprising a multiplicity of receiving means each capable of receiving energy reflected from objects lying within a corresponding one of said volumes, an electron discharge tube including a plurality of elements for directing electron streams in the same relative spatial pattern as said beams and a series of equally spaced stream-intercepting screens whose position along the tube is representative of range, circuit means for applying said received energy from a given volume to corresponding ones of said stream directing elements, means including a commutator for progressively supplying a voltage to successive ones of said screens said commutator rotating at a speed dependent upon the velocity of propagation of said propagated energy, said tube being responsive to the simultaneous application of said positive voltage to a given screen and to the energization of a given element for providing a visual presentation on said screen indicative of the position of said object.

7. A three-dimensional system for indicating the position of objects comprising a transducer array, transmitter means for initially energizing said array, said array being responsive to said energization for propagating energy along a plurality of discrete beams each occupying a given volume, said transducer array comprising a multiplicity of receiving means each capable of receiving energy reflected from objects lying within a corresponding one of said volumes, an electron discharge tube including a plurality of elements for directing electron streams in the same relative spatial pattern as said beams and a series of equally spaced stream-intercepting screens whose position along the tube is representative of range, circuit means for applying said received energy from a given volume to corresponding ones of said stream directing elements, means including a commutator for progressively supplying a positive voltage to successive ones of said screens, said commutator rotating at a speed dependent upon the velocity of propagation of said propagated energy, said tube being responsive to the simultaneous application of said voltage to a given screen and to the energization of a given element for providing a visual presentation on said screen, indicative of the position of said object, and means for altering the manner of applying said positve signal voltage to said screens with respect to the energization of said array to vary the portion of the total volumes presented for inspection.

8. A three-dimensional system for indicating the position of objects comprising an energy directing means for propagating energy along discrete beams occupying a given section of a volume to be explored, said directing means comprising receiving means capable of receiving energy reflected from objects lying within a corresponding section of said volume, an electron discharge tube including an electron stream-forming means for directing an electron stream over a portion of said device corresponding in position to the section of said volume explored and a series of equally spaced stream-intercepting screens whose position along the tube is representative of range, circuit means for applying said received energy from a given section of said volume to said stream-forming means, a source of control voltage, means including a commutator for progressively supplying said control voltage to successive ones of said screens, said commutator rotating at a speed dependent upon the velocity of propagation of said propagated energy, said tube being responsive to the simultaneous application of said control voltage to a given screen and to the energization of a given element for providing a visual presentation on said screen indicative of the position of said object.

9. A three-dimensional system for indicating the position of objects comprising an energy directing means for propagating energy along discrete beams occupying a given section of a volume to be explored, said directing means comprising receiving means capable of receiving energy reflected from objects lying within a corresponding section of said volume, an electron discharge tube including an electron stream-forming means for directing an electron stream over a portion of said device corresponding in position to the section of said volume explored and a series of equally spaced stream-intercepting screens whose position along the tube is representative of range, circuit means for applying said received energy from a given section of said volume to said stream-forming means, a source of control voltage, means including a commutator for progressively supplying said control voltage to successive ones of said screens, said commutator rotating at a speed dependent upon the velocity of propagation of said propagated energy, said tube being responsive to the simultaneous application of said control voltage to a given screen and to the energization of a given element for providing a visual presentation on said screen indicative of the position of said object, means for increasing the rate of commutation to expand the range indication of said screens, and means for altering the manner of applying said control voltage to said screens with respect to the energization of said directing means to vary the portion of the total volumes presented for inspection.

10. A three-dimensional system for indicating the position of objects comprising a transducer array, transmitter means for initially energizing said array, said array being responsive to said energization for propagating energy along a plurality of discrete beams each occupying a given volume, said transducer array comprising a multiplicity of receiving means each capable of receiving energy reflected from objects lying within a corresponding one of said volumes, an electron discharge tube including a plurality of elements for directing electron streams in the same relative spatial pattern as said beams and a series of equally spaced stream-intercepting screens whose position along the tube is representative of range, circuit means for applying said received energy from a given volume to corresponding ones of said stream directing elements, a source of control voltage, means including a commutator for progressively supplying said control voltage to successive ones of said screens, said commutator rotating at a speed dependent upon the velocity of propagation of said propagated energy, said tube being responsive to the simultaneous application of said control voltage to a given screen and to the energization of a given element for providing a visual presentation on said screen indicative of the position of said object, means for increasing the rate of commutation to expand the range indication of said screens, and means for altering the manner of applying said voltage to said screens with respect to the energization of said array to vary the portion of the total volumes presented for inspection.

11. A three-dimensional system for indicating the position of objects comprising a transmitter, means responsive to said transmitter for directively radiating energy along a plurality of discrete beams each occupying a given volume, said means for radiating including a multiplicity of receiving means each capable of receiving energy reflected from objects lying within a corresponding one of said volumes, an electron discharge tube including a plurality of electron stream-forming elements for directing electron streams in the same relative spatial pattern as said beams and a series of equally spaced stream-intercepting screens whose position along said tube is representative of range, circuit means for applying said received energy from a given volume to corresponding ones of said stream-forming elements, a source of control voltage, means including a commutator for progressively supplying said control voltage to successive ones of said screens, said commutator rotating at a speed dependent upon the velocity of propagation of said radiated energy, said tube being responsive to the simultaneous application of said control voltage to a given screen and to the energization of a given stream-forming element for providing a visual presentation on said screen indicative of the position of said object.

12. A three-dimensional system for indicating the position of objects comprising a transmitter, means responsive to said transmitter for directively radiating energy along a plurality of discrete beams each occupying a given volume, said means for radiating including a multiplicity of receiving means each capable of receiving energy reflected from objects lying within a corresponding one of said volumes, an electron discharge tube including a plurality of electron stream-forming elements for directing electron streams in the same relative spatial pattern as said beams and a series of equally spaced stream-intercepting screens whose position along the tube is representative of range, circuit means for applying said received energy from a given volume to corresponding ones of said stream-forming means, a source of control voltage, means including a commutator for progressively supplying said control voltage to successive ones of said screens, said commutator rotating at a speed dependent upon the velocity of propagation of said radiated energy, said tube being responsive to the simultaneous application of said control voltage to a given screen and to the energization of a given stream-forming element for providing a visual presentation on said screen indicative of the position of said object, and means for altering the manner of applying said voltage to said screens with respect to the radiation from said transmitter to vary the portion of the total volumes presented for inspection.

13. A three-dimensional system for indicating the position of objects comprising a plurality of transducer elements arranged in a predetermined array, a transmitter, means for cyclically keying said transmitter, means responsive to keying of said transmitter for energizing said transducer elements in phase, said transducer elements each being responsive to energization for directing energy along a discrete beam occupying a given volume, each of said transducer elements being receptive of energy reflected from objects located within a corresponding volume, an electron discharge device including a multiplicity of electron stream sources arrayed to correspond to said array of transducer elements, each of said electron stream sources being activated during reception of reflected energy by a corresponding transducer element, a control signal, said device further including a plurality of electron stream intercepting screens coated with a phosphorescent material, commutator means for progressively applying said control signal to successive ones of said screens at a rate dependent upon the speed of propagation of said energy, said screens being capable of emitting visible radiation only during the application thereto of said control signal, said device being responsive to simultaneous activation of a given stream source and to application of said control signal to a given screen for producing illumination over the region of interception by said given screen of the stream from said given source whereby the position of said object is indicated.

14. A three-dimensional system for indicating the position of objects comprising a plurality of transducer elements arranged in a predetermined array, a transmitter, means for cyclically keying said transmitter, means responsive to keying of said transmitter for energizing said transducer elements in phase, said transducer elements each being responsive to energization for directing energy along a discrete beam occupying a given volume, each of said transducer elements being receptive of energy reflected from objects located within a coersponding volume, an electron discharge device including a multiplicity of electron stream sources arrayed to correspond to said array of transducer elements, each of said electron stream sources being activated during reception of reflected energy by a corresponding transducer element, a control signal, said device further including a plurality of electron stream intercepting screens coated with a phosphorescent material, commutator means for progressively applying said control signal to successive one of said screens at a rate dependent upon the speed of propagation of said energy, said screens being capable of emitting visible radiation only during the application thereto of said control signal, said device being responsive to simultaneous activation of a given stream source and to application of said control signal to a given screen for producing illumination over the region of interception by said given screen of the stream from said given source whereby the position of said object is indicated, means for varying said rate of applying to select a portion of the volumes capable of being examined, and means for delaying the application of said control signal to the first of said screens until after the keying of said transmitter to vary the portions of the volumes selected.

15. A three-dimensional system for indicating the position of objects comprising a transmitter adapted to be cyclically keyed, means responsive to keying of said transmitter for directively radiating energy along a discrete beam occupying a given volume, said means for radiating including a multiplicity of receiving means each receptive of energy reflected from objects located within a corresponding volume, an electron discharge device including a multiplicity of electron stream sources arrayed to correspond to the spatial pattern of said beams, each of said electron stream sources being activated during reception of reflected energy by a corresponding receiving means, a control signal, said device further including a plurality of electron stream intercepting screens coated with a phosphorescent material, commutator means for progressively applying said control signal to successive ones of said screens at a rate dependent upon the speed of propagation of said energy, said screens being capable of emitting visible radiation only during the application thereto of said control signal, said device being responsive to simultaneous activation of a given stream source and to application of said control signal to a given screen for producing illumination over the region of interception by said given screen of the stream from said given source whereby the position of said object is indicated.

16. A three-dimensional system for indicating the position of objects comprising a transmitter adapted to be cyclically keyed, means responsive to keying of said transmitter for directively radiating energy along discrete beams each occupying a given volume, said means for radiating including a multiplicity of receiving means each receptive of energy reflected from objects located within a corresponding volume, an electron discharge device including a multiplicity of electron stream sources arrayed to correspond to the spatial pattern of said beams, each of said electron stream sources being activated during reception of reflected energy by a corresponding receiving means, a control signal, said device further including a plurality of electron stream intercepting screens coated with a phosphorescent material, commutator means for progressively applying said control signal to successive ones of said screens at a rate dependent upon the speed of propagation of said energy, said screens being capable of emitting radiation only during the application thereto of said control signal, said device being responsive to simultaneous activation of a given stream source and to application of said control signal to a given screen for producing illumination over the region of interception by said given screen of the stream from said given source whereby the position of said object is indicated, means for varying said rate of applying to select a given portion of the volumes capable of being examined, and means for delaying the application of said control signal to the first of said screens until after the keying of said transmitter to vary the portion of the volumes selected.

No references cited.